United States Patent Office 2,850,924
Patented Sept. 9, 1958

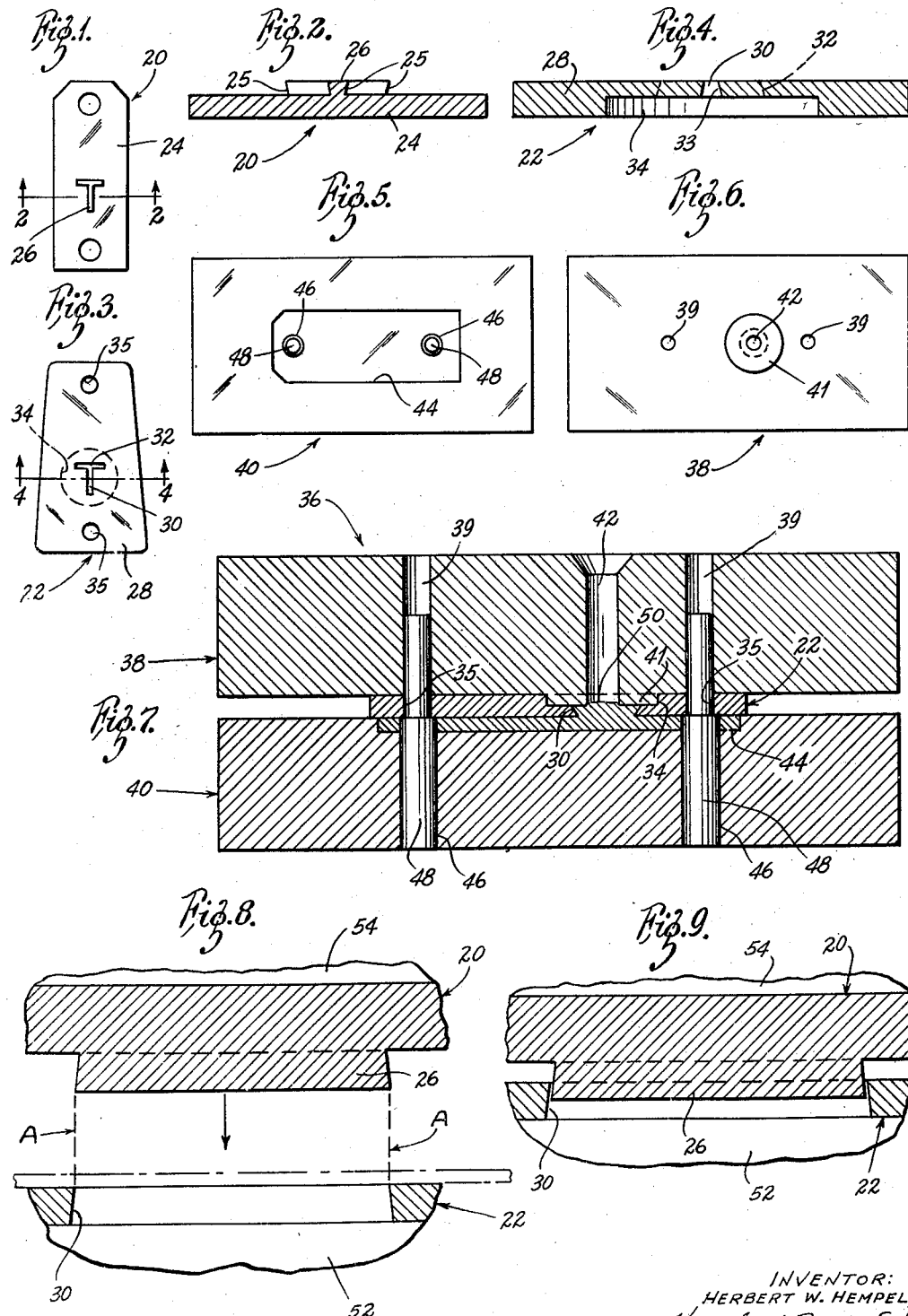

2,850,924

METHOD OF MAKING MATCHED SETS OF PUNCHES AND DIES FOR STENCIL CUTTING MACHINES

Herbert W. Hempel, Belleville, Ill., assignor to Marsh Stencil Machine Company, Belleville, Ill., a corporation of Illinois Application May 9, 1955, Serial No. 506,930

5 Claims. (Cl. 76—107)

The present invention is concerned with matched sets of punches and dies for stencil cutting machines, or the like, and with a method of manufacturing the same.

In brief, the present novel matched punch and die set comprises a punch in which the character is cast integral with the supporting base and includes side edges having a predetermined negative draft or bias. The character-defining openings of the die comprise walls having a draft or bias complementary with that of the character of the punch. The cutting edge of the character of the punch has substantially zero clearance with the punch-receiving edge of the die. The novel method contemplates the use of the die as an insert in a die-casting or powder metal mold. The complementary punch character is cast in the insert die, and the resulting cast punch and the die are thereafterwards installed as manufactured articles as part of a stencil machine, or the like, being substantially ready for use following the casting operation.

Therefore, an object of the present invention is to provide novel matched sets of punches and dies for stencil cutting machines and a novel method of manufacturing the same.

Another object is to provide a novel cast punch and stamped die set for a stencil machine, or the like, in which the character of the former is cast in the latter, and has negative draft.

Another object is to provide a novel matched punch and die set for stencil cutting machines in which the former is cast in the latter which eliminates hand operations formerly required in preparing matched sets of punches and dies for stencil cutting machines.

Another object is to provide a matched punch and die set for stencil cutting machines, or the like, and a method of manufacturing the same, in which the former is cast in the latter as an insert in a mold and in which the resultant parts have substantially zero clearance between the cutting edge of the punch and the punch-receiving edge of the die.

Other objects are to provide novel matched punch and die sets for stencil cutting machines, or the like, and a method of manufacturing the same which is relatively inexpensive, in which the matched punch and die sets are ready for use in a stencil cutting machine with minimum finishing, and which otherwise fulfill the objects and advantages sought therefor.

The foregoing and other objects and advantages are apparent from the following description taken with the accompanying drawing, in which:

Figure 1 is a plan view of a punch incorporating the teachings of the present invention;

Figure 2 is an enlarged cross-sectional view taken on substantially the line 2—2 of Figure 1;

Figure 3 is a plan view of a die incorporating the teachings of the present invention;

Figure 4 is an enlarged cross-sectional view taken on substantially the line 4—4 of Figure 3;

Figure 5 is a plan view of the bottom member of a die-casting mold;

Figure 6 is a bottom view of the top part of a die-casting mold;

Figure 7 is an enlarged central vertical cross-sectional view through an assembled die-casting mold complete with insert and cast material;

Figure 8 is an enlarged fragmental view of a punch and die incorporating the teachings of the present invention, mounted in operative opposed relation in a stencil cutting machine; and Figure 9 is a view similar to Figure 8, but with the punch and die in closed relationship, as following a stencil cutting operation.

Referring to the drawing more particularly by reference numerals, 20 indicates a cast punch and 22 a die incorporating the teachings of the present invention. The punch 20 includes a base plate 24 and a raised integral character 26 illustrated as the letter T. The character 26 has sides 25 having a negative draft or bias of around 3° to 6° from the vertical.

The die 22 comprises a base plate 28 in which are cut the stem 30 and head 32 of a T. Walls 33 defining the stem 30 and head 32 have a negative draft or bias complementary to that of the side walls 25 of the T 26. A countersunk area 34 is provided in small dies to reduce the thickness of the piercing area, but is omitted in larger dies.

The present novel method of manufacturing the novel punch 20 may be carried out by the use of a die casting or powder metal mold 36 which includes an upper part 38 and a lower part 40.

The upper part 38 has core pin alignment openings 39, a pouring gate 42 (which serves as a vent in powder molding), and a button 41. The lower part 40 has a cavity 44 of the form of the punch plate 24 and core pin apertures 46 therethrough. Core pins 48 of the configuration shown are mounted in the openings 46.

In carrying out the present novel method, the die 22 is disposed on the lower part 40 of the mold 36 with the apertures 35 thereof disposed on the pins 48 and with the countersunk area 34 up. Thereafterwards, the upper part 38 is disposed as shown with the pins 48 extending through the openings 39 and the button 41 in the area 34. Metal is poured or forced through the gate 42 filling the cavity 44 and the stem 30 and head 32 of the T in the die 22. A small amount of excess material or sprue 50 will be left above the stem 30.

The molten material is permitted to cool, whereupon the upper part 38 is removed from the pins 48, and the die 22 and cast punch 20 are likewise removed from the pins 48. The punch 20 is separated from the die 22 which is permitted by reason of the fact that the molten metal in cooling shrinks. The relationship of the draft of the side walls of the cast T 26 and the stem 30 and head 32 are such that, upon cooling, there is substantially zero clearance between the cutting edge of the T 26 and the punch-receiving edges of the T stem 30 and head 32 in the die 22.

The T 26 is ground to a smooth surface to remove the small amount of surplus material or sprue 50, and any other excess removed, and the punch 20 and die 22 are ready for mounting in a stencil cutting machine.

It is to be understood, of course, that the mold parts 38 and 40 are held together by clamps or other suitable means while in use. Other forms and kinds of molds may be used in carrying out the present novel method.

In Figures 8 and 9, the die 22 is illustrated as secured to a stationary portion 52 of a stencil cutting machine, and the punch 20 as secured to a moving part 54 thereof. As is customary with stencil cutting machines, the part 54 of the machine moves toward and away from the parts 52 in a substantially straight line action during the cutting operation. The broken lines A between the cutting edge of the letter T 26 and the punch character-receiving opening edges of the stem 30 and the head 32 of the T formed in the die 22 indicate substantially zero clearance therebetween.

In Figure 9, the punch 20 is illustrated in its lowermost position in relation to the die 22. It will be observed that there is a clearance between the side walls of the T 26 and the stem 30 which was established upon cooling of the metal in casting the punch 20.

It is manifest, therefore, that the applicant has provided a punch and die set for stencil cutting machines which are novel per se, and which are formed in the novel manner described in which one article of manufacture, namely, the die, serves as an insert in a mold in which the punch is cast, the two parts thereafterwards being employed as a set on a stencil cutting machine.

It is not difficult to determine the degree of reverse draft of the character of the punch 20 and die 22 for particular metals. For example, when the punch 20 is formed of bronze metal, the reverse draft of the walls of the cut-out character, such as the stem 30 and head 32 of the T, is substantially 3° from the vertical for a stencil character of average thickness. With bronze, shrinkage runs around 0.005" per inch and half would occur at each side.

Obviously, the negative draft or character side wall angle will vary with the thickness of the character, since the objective is substantially zero clearance. Hence, if the draft angle is 4° from the vertical for "x" thickness, the draft angle must be decreased for a character of greater thickness and increased for one of less thickness; a very simple calculation in any case. A practical formula is $\tan \alpha = \frac{1}{2S}$ where $\alpha$ is the draft angle sought, "S" is the shrinkage of the metal per inch, and "H" is the thickness of the character. Since both "S" and "H" are known, $\alpha$ can be easily found.

It is manifest that there have been provided a novel punch and die set and method for manufacturing the same.

It is to be understood that the foregoing description and the accompanying drawing have been given by way of illustration and example. It is also to be understood that changes in form of the several parts, substitution of equivalent elements or steps, and rearrangement of parts or steps, which will be readily apparent to one skilled in the art, are contemplated as within the scope of the present invention which is limited only by the claims which follow.

What is claimed is:

1. A method of manufacturing a matched punch and die set for stencil cutting machines comprising providing a mold with a cavity therein of a form of the base of a punch, inserting a precut die having a cut-out character with negative draft walls of predetermined degree in said mold above said cut-out, closing said mold in a manner to provide a pouring spout to said character in said die, pouring molten metal in said cavity and character, permitting said molten metal to cool and contract a predetermined amount, removing said punch and die from the mold, and separating said punch from said die.

2. A method of making a punch and die set for stencil machines, or the like, comprising placing in a cavity-containing mold as an insert a precut die having a cut-out character with negative draft side walls of predetermined degree, pouring molten metal in said cavity and character, permitting the metal to cool and to shrink so that the cast punch character in said cut-out character has a cutting edge outline slightly less than the punch character-receiving edge of the die character, and removing the cast punch and the die from the mold and the cast punch from the die.

3. A method of making a punch and die set for stencil machines, or the like, comprising placing in a cavity-containing mold as an insert a precut die having a cut-out character with negative draft side walls of predetermined degree, pouring molten metal in said cavity and character, permitting the metal to cool and to shrink so that the cast punch character in said cut-out character has a cutting edge outline slightly less than the punch character-receiving edge of the die character, removing the cast punch and the die from the mold and the cast punch from the die, and mounting the cast punch and insert die as a set on a stencil cutting machine, or the like.

4. A method of manufacturing a matched cast punch and preformed die set comprising forming a die with a character having walls of predetermined degree with negative draft, providing a die with a cavity for forming the base plate of a cast punch, disposing the die in the mold over the punch base plate cavity, closing the mold, pouring molten metal into the die character and into the cavity, permitting the poured metal to cool and contract from contact with the walls of the die character a predetermined amount to leave the punch character cutting edge slightly smaller than the punch character-receiving edge of the die character to provide substantially zero clearance therebetween, and removing the punch and die from the mold.

5. A method of manufacturing a matched cast punch and preformed die set comprising forming a die with a character having walls of predetermined degree with negative draft, providing a die with a cavity for forming the base plate of a cast punch, disposing the die in the mold over the punch base plate cavity, closing the mold, pouring molten metal into the die character and into the cavity, permitting the poured metal to cool and contract from contact with the walls of the die character a predetermined amount to leave the punch character cutting edge slightly smaller than the punch character-receiving edge of the die character to provide substantially zero clearance therebetween, removing the punch and die from the mold, and mounting the cast punch and the companion insert die in a stencil cutting machine as a matched set.

References Cited in the file of this patent

UNITED STATES PATENTS

| Number | Name | Date |
|---|---|---|
| 369,955 | Meyer | Sept. 13, 1887 |
| 1,883,335 | Bradin | Oct. 18, 1932 |
| 2,384,229 | Ammann | Sept. 4, 1945 |
| 2,397,168 | Touceda | Mar. 26, 1946 |
| 2,611,435 | Janiszewski | Sept. 23, 1952 |
| 2,627,313 | Marsilius | Feb. 3, 1953 |